United States Patent [19]

Rovnyak et al.

[11] 3,926,982
[45] Dec. 16, 1975

[54] SUBSTITUTED BENZIMIDAZOLINETHIONES

[75] Inventors: George Rovnyak, Hopewell; Venkatachala L. Narayanan, Hightstown; Rudiger D. Haughwitz, Titusville; Christopher M. Cimarusti, Hamilton, all of N.J.

[73] Assignee: E. R. Squibb & Sons, Inc., Princeton, N.J.

[22] Filed: July 3, 1974

[21] Appl. No.: 485,419

[52] U.S. Cl. ...... 260/243 R; 260/306.7 T; 424/246; 424/270
[51] Int. Cl.² .................................. C07D 235/28
[58] Field of Search .............. 260/306.7 T, 243 R

[56] References Cited
UNITED STATES PATENTS
3,759,903  9/1973  Haugwitz et al. ............ 260/306.7 T OTHER PUBLICATIONS
Wagner et al., Synthetic Organic Chemistry, John Wiley, N.Y., 1953, pp. 645 & 666–670.

Primary Examiner—R. J. Gallagher
Attorney, Agent, or Firm—Lawrence S. Levinson; Merle J. Smith; Stephen B. Davis

[57] ABSTRACT
Compounds of the following formula

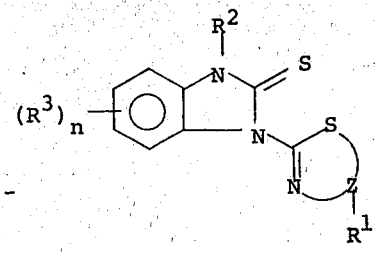

wherein Z is ethylene or propylene; $R^1$ is hydrogen, methyl, ethyl, phenyl, nitrophenyl, benzyl, phenethyl, tolyl or xylyl; $R^2$ is hydrogen, alkyl of from 1 to 5 carbons, benzyl, nitrobenzyl, phenethyl, nitrophenethyl, alkoxycarbonylalkylene wherein the alkoxy radical has from 1 to 5 carbons and the alkylene radical has 1 to 3 carbons, dialkylaminoalkylene wherein the dialkyl radicals have from 1 to 3 carbons and the alkylene radical has 2 or 3 carbons, alkanoyl of from 2 to 18 carbons, benzoyl, a substituted benzoyl wherein said substituent is halogen, alkyl of 1 to 3 carbons or phenyl,

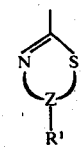

wherein Z and $R^1$ are as defined above,

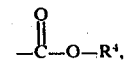

or

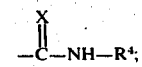

$R^4$ is alkyl of 1 to 3 carbons, phenyl, benzyl or phenethyl; X is O or S; $R^3$ is hydrogen, halogen, nitro, amino, cyano, trifluoromethyl, alkyl of from 1 to 3 carbons, alkoxy of from 1 to 3 carbons, dialkylamino wherein each alkyl radical is from 1 to 3 carbons, alkanoyl of from 2 to 6 carbons, or benzoyl; and n is 1 or 2; are disclosed. These compounds exhibit antiinflammatory activity.

11 Claims, No Drawings

SUBSTITUTED BENZIMIDAZOLINETHIONES

BACKGROUND OF THE INVENTION

The prior art discloses the use of a substituted benzimidazolinone compounds as antiinflammatory agents as note U.S. Pat. No. 3,813,409 issued on May 28, 1974. Surprisingly, it has been discovered that the corresponding sulfur containing compounds are also useful as antiinflammatory agents and that it is possible to prepare such compounds despite the greater nucleophilicity of sulfur over nitrogen.

This invention relates to new compounds of the formula:

(I)
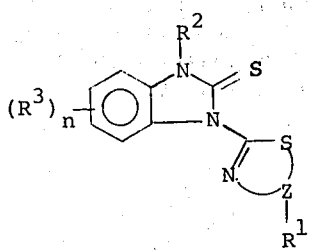

which exhibit antiinflammatory activity.

Z represents ethylene or propylene.

$R^1$ represents hydrogen, methyl, ethyl, phenyl, nitrophenyl, benzyl, phenethyl, tolyl or xylyl.

$R^2$ is hydrogen; alkyl of 1 to 5 carbons, e.g. methyl, ethyl, n-propyl, i-propyl, t-butyl, etc.; benzyl; nitrobenzyl; phenethyl; nitrophenyl; alkoxycarbonylalkylene wherein the alkoxy radical has from 1 to 5 carbons, e.g. methoxy, i-propoxy, t-butoxy, etc., and the alkylene radical has 1 to 3 carbons, e.g. $-CH_2-$, $-(CH_2)_2-$, $-(CH_2)_3-$,

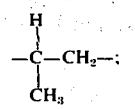

dialkylaminoalkylene wherein each alkyl radical has 1 to 3 carbons and the alkylene radical has 2 or 3 carbons; alkanoyl of from 2 to 18 carbons; benzoyl; substituted benzoyl wherein said substituent is halogen, alkyl of 1 to 3 carbons, or phenyl;

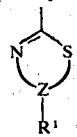

wherein Z and $R^1$ are as defined above;

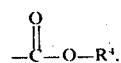

or

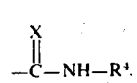

$R^4$ is alkyl of 1 to 3 carbons, phenyl, benzyl, or phenethyl.

X is O or S.

$R^3$ is hydrogen, halogen, nitro, amino, cyano, trifluoromethyl, alkyl of from 1 to 3 carbons, alkoxy of from 1 to 3 carbons, dialkylamino wherein each alkyl radical is from 1 to 3 carbons, alkanoyl of from 2 to 6 carbons, or benzoyl.

$n$ is one or two.

The compounds of formula I having a basic substituent, for example, where $R^2$ is dialkylaminoalkylene or $R^3$ is amino or dialkylamino form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate, and the like.

DETAILED DESCRIPTION OF THE INVENTION

Compounds of formula I where $R^2$ is hydrogen are prepared from the appropriate 2-(o-aminoanilino)-2-thiazoline of formula II by heating with carbon disulfide in alcohol, or by the action of thiophosgene in chloroform, or by heating with potassium ethyl xanthate (Van Allan et al., Organic Syntheses, Collective Vol. 4, p. 569–570).

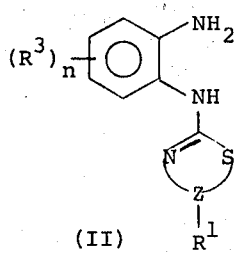 → 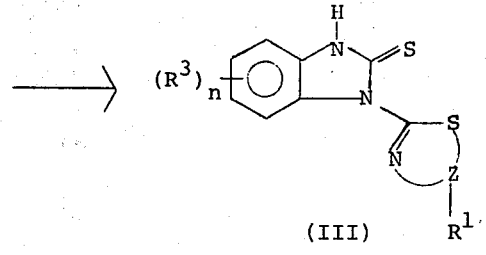

(II)    (III)

The substituted benzimidazole of formula III may exist in a tautomeric form wherein a hydrogen atom is attached to the sulfur atom and the double bond is endocyclic.

The 2-(o-aminoanilino)-2-thiazolines of formula II are prepared by reacting o-phenylenediamine of formula IV with an haloalkylisothiocyanate of formula V.

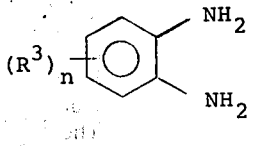 + 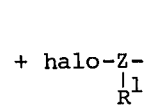 → 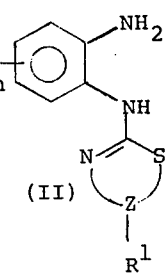

(IV)    (V)    (II)

Due to the greater nucleophilicity of S over N it would be expected that the reaction of compounds of formula III with electrophiles would result in addition occurring at the S atom and not at the N atom. However, it has been discovered that by employing certain conditions the reaction will occur at the N atom. These conditions involve the use of a non-polar aprotic solvent and either a weak base or the absence of base. Suitable non-polar aprotic solvents include aromatic hydrocarbons such as benzene, toluene and xylene, ketones such as methyl ethyl ketone, esters such as ethyl acetate, and ethers such as 1,2-dimethoxyethane (glyme) and bis(2-methoxyethyl)ether (diglyme). Suitable weak bases include amines such as pyridine, triethylamine, N,N-dimethylaniline and N-ethylpiperidine.

Compounds of formula I where $R^2$ is alkyl, benzyl, nitrobenzyl, phenethyl and nitrophenethyl are prepared by reacting the substituted benzimidazole of formula II with the appropriate alkyl halide, benzyl halide, phenethyl halide, etc., at a molar ratio of from about 1:1 to about 1:3 at a temperature of from about 25°C to about 150°C for about 0.5 hours to about 24 hours in the presence of a non-polar aprotic solvent and weak base or absence of base as defined above. Similarly, compounds of formula I where $R^2$ is

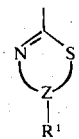

are prepared by reacting the substituted benzimidazole of formula III with a haloalkylisothiocyanate of formula V under these conditions in the presence of a non-polar aprotic solvent and weak base as defined above.

Compounds of formula I where $R^2$ is alkanoyl, benzoyl, substituted benzoyl, alkoxycarbonylalkylene, dialkylaminoalkylene, alkoxycarbonyl, phenoxycarbonyl, benzyloxycarbonyl, or 2-phenyl ethoxycarbonyl are prepared by treating the substituted benzimidazole of formula III with the appropriate halo-$R^2$ at a molar ratio of from about 1:1 to about 1:1.5 at a temperature of from about 5°C to about 120°C for about 0.25 to about 8 hours in the presence of a non-polar aprotic solvent and weak base or absence of base as defined above.

Compounds of formula I wherein $R^2$ is a substituted urea or thiourea are prepared by reacting the substituted benzimidazole of formula III with a compound of formula (VI) $R^4-N=C=X$ at a molar ratio of from about 1:2 to about 1:50 at a temperature of about 0°C to about 140°C for about 0.5 to about 24 hours in a non-polar aprotic solvent and weak base or absence of base as defined above.

Alternatively, compounds of formula I where $R^2$ is either hydrogen or

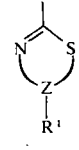

can be prepared by treating mercaptobenzimidazoles of formula (VII)

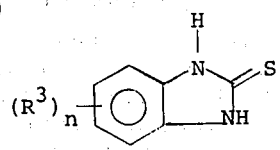

with haloalkylisothiocyanate of formula V at a temperature of from about 25°C to about 150°C for about 0.5 to about 24 hours in the presence of a non-polar aprotic solvent as defined above. This reaction is preferably performed in the presence of a strong base as sodium hydride. A mixture of several products is formed from which the compounds of formula I where $R^2$ is hydrogen and where $R^2$ is

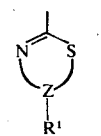

can be separated by either crystallization or chromatography.

The mercaptobenzimidazoles of formula VII are obtained by known methods from the o-phenylenediamines of formula IV, as for example, by heating with carbon disulfide in alcohol, by the action of thiophosgene in chloroform, or by heating with potassium xanthate (Van Allan et al., supra).

The preferred compounds are those wherein $R^1$ is hydrogen; n is one; $R^3$ is hydrogen, halogen, nitro, or alkyl of 1 to 3 carbons; and $R^2$ is hydrogen

benzyl, alkyl of 1 to 3 carbons, $-(CH_2)_2N(CH_3)_2$,

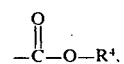

or

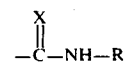

wherein $R^4$ is alkyl of 1 to 3 carbons or phenyl and X is O or S.

The most preferred compounds are those wherein Z is ethylene; $R^3$ is hydrogen, methyl or Cl, especially hydrogen; and $R^2$ is hydrogen.

The compounds of this invention are useful as antiinflammatory agents and are effective in the prevention and inhibition of granuloma tissue formation in warm blooded animals, and may be used, for example, in a manner similar to phenylbutazone or indomethacin. They may be used to decrease joint swelling, tenderness, pain and stiffness in mammalian species, e.g., in conditions such as rheumatoid arthritis. The compounds of this invention or a physiologically acceptable acid-addition salt thereof as described above may be compounded according to accepted pharmaceutical practice for administration orally or by injection. Suitable oral dosage forms are tablets, capsules, exixirs or powders, while solutions or suspensions are suitable for injection. The quantity administered may be from about 25 mg. to about 2 gm. per day, and preferably from about 50 mg. to about 200 mg. per day.

The following examples are illustrative of the invention. All temperatures are on the centrigrade scale.

EXAMPLE 1

1-(4,5-Dihydro-2-thiazolyl)-1,3-dihydro-2H-benzimidazole-2-thione a. 2-(o-Aminoanilino)-2-thiazoline A solution of 7.8 g. (0.07 mole) of o-phenylenediamine and 11.9 g. (0.07 mole) of 2-bromoethyl isothiocyanate in 150 ml. of dry glyme is stirred at room temperature for one hour. The solution is decanted and the remaining viscous oil is taken up in water, basified with $K_2CO_3$ and extracted with warm $CHCl_3$. The combined $CHCl_3$ extracts are washed with water and cooled in an ice-bath. The precipitated crystals are collected by filtration and dried yielding 6.6 g. of 2-(o-aminoanilino)-2-thiazoline. Recrystallization from $CHCl_3$ yields an analytical sample, m.p. 165°–167°.

b) 1-(4,5-Dihydro-2-thiazolyl)-1,3-dihydro-2H-benzimidazole-2-thione

A solution of 7.0 g. (0.04 mole) of 2-(o-aminoanilino)-2-thiazoline from part (a), 11.2 g. (0.15 mole) of carbon disulfide and 2.8 g. (0.05 mole) of KOH in 70 ml. of ethanol and 10 ml. of water is refluxed for five hours. After the reaction mixture is cooled, hair-like crystals are formed in the flask. These crystals are collected by filtration and washed with diethyl ether yielding 2.4 g. (25%) of 1-(4,5-dihydro-2-thiazolyl)-1,3-dihydro-2H-benzimidazole-2-thione; m.p. 188°–189°.
Alternatively:

c. 1-(4,5-Dihydro-2-thiazolyl)-1,3-dihydro-2H-benzimidazole-2-thione

A solution of 7.6 g. (0.066 mole) of thiophosgene in 150 ml. of glyme and a solution of 12.1 g. (0.12 mole) of triethylamine in 150 ml. of glyme are added simultaneously over 1.5 hours to a solution of 11.6 g. (0.06 mole) of 2-(o-aminoanilino)-2-thiazoline from part (a) in 200 ml. of glyme at a temperature of 25°. The resulting solution is then stirred at 40° for 2.5 hours. The solids are removed by filtration. The filtrate is concentrated in vacuo and the residue is dissolved in 600 ml. of $CHCl_3$ and washed with 10% HCl, 10% $NaHCO_3$ and water. The product is purified by extracting into aqueous NaOH, washing the aqueous extract with $CHCl_3$ and precipitating with concentrated HCl. The precipitate is crystallized from aqueous methanol yielding about 8.0 g. (60%) of 1-(4,5-dihydro-2-thiazolyl)-1,3-dihydro-2H-benzimidazole-2-thione; m.p. 187°–189.5°.

EXAMPLE 2

1-(5,6-Dihydro-4H-1,3-thiazin-2-yl)-1,3-dihydro-2H-benzimidazole-2-thione a. N-(5,6-dihydro-4H-1,3-thiazin-2-yl)o-phenylenediamine A solution of 7.8 g. (0.07 mole) of o-phenylenediamine and 12.6 g. (0.07 mole) of 3-bromopropylisothiocyanate in 150 ml. of dry glyme is stirred at room temperature for one hour. The solvent is decanted and the remaining viscous oil is taken up in 200 ml. of water, basified with solid $K_2CO_3$ and extracted three times with 200 ml. of $CHCl_3$. The $CHCl_3$ extracts are washed with water, combined, dried ($CaCl_2$) and concentrated on a steam bath to approximately 300 ml. N-(5,6-dihydro-4H-1,3-thiazin-2-yl)o-phenylenediamine is obtained upon cooling the $CHCl_3$ solution.

b. 1-(5,6-Dihydro-4H-1,3-thiazin-2-yl)-1,3-dihydro-2H-benzimidazole-2-thione

A solution of 2.53 g. (0.22 mole) of thiophosgene in 50 ml. of glyme and a solution of 4.45 g. (0.44 mole) of triethylamine in 50 ml. of glyme are added simultaneously over 1.5 hours to a solution of 4.14 g. (0.2 mole) of N-(5,6-dihydro-4H-1,3-thiazin-2-yl)o-phenylenediamine from part (a) in 100 ml. of dry glyme at 25°. The reaction mixture is stirred an additional 3 hours at 40°. After cooling, the solids are removed from the solution by filtration and the filtrate is concentrated in vacuo. The viscous residue is dissolved in $CHCl_3$ and washed with 10% HCl, 10% $NaHCO_3$ and water. The product is extracted into N aqueous NaOH, from which it is recovered by acidification with concentrated HCl. The precipitate, thus obtained, is crystallized from aqueous ethanol yielding 1-(5,6-dihydro-4H-1,3-thiazin-2-yl)-1,3-dihydro-2H-benzimidazole-2-thione.

EXAMPLES 3–10

Following the procedures of the previous examples but employing the haloalkylisothiocyanate shown in column A the product shown in column B is obtained.

| Ex. | Col. A<br>halo-Z-NCS<br>$R^1$ | Col. B |
|---|---|---|
| | Z / $R^1$ | |
| 3 | $-CH_2-CH-$<br>$\quad\quad\;\;\, CH_3$ | |
| 4 | $-CH_2-CH-CH_2-$<br>$\quad\quad\;\;\, C_2H_5$ | |
| 5 | $-CH_2-CH-$<br>$\quad\quad\;\;\,$ (phenyl) | |
| 6 | $-CH_2-CH-CH_2-$<br>$\quad\quad\;\;\,$ (p-$NO_2$-phenyl) | |

Col. B structure: benzimidazole-2-thione fused with a ring containing N–C(=?)–N and Z, with $R^1$ substituent.

| Ex. | $-\overset{Z}{\underset{R^1}{|}}$ |
|---|---|
| 7 | —CH₂—CH—<br>          CH₂<br>          \|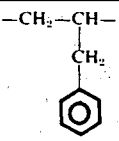 |
| 8 | —CH₂—CH₂—CH—<br>                   CH₂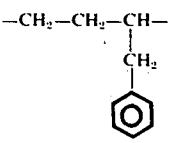 |
| 9 | —CH₂—CH—CH₂—<br>         \|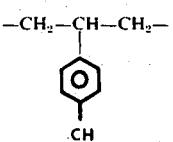<br>         CH₃ |
| 10 | —CH₂—CH—<br>          CH₂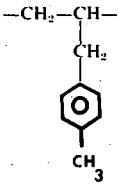<br>             CH₃ |

EXAMPLE 11

1-(4,5-Dihydro-2-thiazolyl)-1,3-dihydro-2H-benzimidazole-2-thione and
1,3-bis(4,5-dihydro-2-thiazolyl)-1,3-dihydro-2H-benzimidazole-2-thione 1.8 g. (0.08 mole) of sodium hydride is added with stirring to a solution of 3.8 g. (0.03 mole) of 2-mercaptobenzimidazole in 200 ml. of dry glyme. After the evolution of hydrogen ceases (approximately 1.5 hours), 6.1 g. (0.05 mole) of 2-chloroethyl isothiocyanate is added; and the resulting mixture is refluxed for three hours. The mixture is cooled and the solvent removed by distillation in vacuo. The resulting residue is washed with water, filtered and dried, yielding 6.0 g. of crude product. Fractional crystallization from ethanol yields the titled compounds.

The 1,3-bis(4,5-dihydro-2-thiazolyl)-1,3-dihydro-2H-benzimidazole-2-thione has the lowest solubility in ethanol. Two recrystallizations from ethanol yields 0.5 g.; m.p. 176°–177°.

The 1-(4,5-dihydro-2-thiazolyl)-1,3-dihydro-2H-benzimidazole-2-thione has the highest solubility in ethanol. After it is isolated, it is then recrystallized from CH₃CN yielding 0.4 g.; m.p. 183°–185°.

EXAMPLE 12

1-(4,5-Dihydro-2-thiazolyl)-1,3-dihydro-5(or 6)-methyl-2H-benzimidazole-2-thione.

A solution of 6.85 g. (0.0416 mole) of 2-mercapto-5-methyl-benzimidazole [prepared by the general method of Van Allan et al., Org. Syn., Coll. Vol. 4, p. 569 (1963), m.p. 285°–292°] in 270 ml. of dry glyme is stirred under nitrogen at room temperature with 4.05 g. (0.0955 mole) of 57% sodium hydride dispersion in mineral oil. After 1.5 hours, 10 g. (0.0832 mole) of 2-chloroethyl isothiocyanate is added and the slurry is refluxed for three hours, cooled, and the solvent removed in vacuo. The residue is treated with methanol to decompose unreacted hydride and the methanol is removed in vacuo. The resulting oil is triturated with hexane (hexane discarded) and the oil is partitioned between chloroform and water containing a slight excess of acetic acid. The chloroform solution is dried and the solvent removed in vacuo yielding 14.5 g. of crude product. A solution of 11.5 g. of this solid in 1:1 chloroform-hexane is chromatographed on a 225 g. alumina (neutral, activity III) column. Elution with chloroform-hexane mixtures and then chloroform yields 4 g. of TLC pure material. Recrystallization from chloroform-hexane yields 2.4 g. of 1-(4,5-dihydro-2-thiazolyl)-1,3-dihydro-5(or 6)-methyl-2H-benzimidazole-2-thione; m.p. 197°–199°.

EXAMPLE 13

5(or 6)-Chloro-1-(4,5-dihydro-2-thiazolyl)-1,3-dihydro-2H-benzimidazole-2-thione A solution of 7.7 g. (0.041 mole) of 5-chlorobenzimidazole-2-thione in 270 ml. dry glyme is stirred under nitrogen and 4.05 g. (0.0955 mole) of 57% sodium hydride dispersion in mineral oil is added. After stirring at room temperature for 1.5 hours, 12.5 g. (0.1035 mole) of 2-chloroethyl isothiocyanate is added and the reaction mixture is refluxed overnight. The solvent is removed in vacuo and the residue is triturated with methanol. After removal of the methanol in vacuo, hexane is added and removed by decantation. The gummy residue is partitioned between chloroform and water. The chloroform extract is dried with sodium sulfate and evaporated in vacuo yielding 3.7 g. of crude product. This solid material is dissolved in chloroform and chromatographed on an 80 g. alumina (neutral, activity II) column. Elution with chloroform yields 3.0 g. of TLC pure product. Crystallization from methanol yields 2.0 g. of 5(or 6)-chloro-1-(4,5-dihydro-2-thiazolyl)-1,3-dihydro-2H-benzimidazole-2-thione; m.p. 248°–250°.

EXAMPLE 14

1-(4,5-Dihydro-2-thiazolyl)-1,3-dihydro-5(or 6)-nitro-2H-benzimidazole-2-thione 9.75 g. (0.05 mole) of 5-nitro-benzimidazole-2-thione is added, portionwise, at room temperature to a stirred slurry of 1.5 g. (0.06 mole) of sodium hydride in 400 ml. of dry glyme. After the evolution of hydrogen ceases, 7.25 g. (0.06 mole) of 2-chloroethyl isothiocyanate in 200 ml. of dry glyme is added. The resulting mixture is heated at reflux temperature for three hours. The mixture is cooled and the solvent is removed in vacuo. The residue is dissolved in CHCl₃ and washed with 10% HCl and twice with water. The organic fraction is dried (CaCl₂), treated with charcoal and concentrated in vacuo. The 1-(4,5-dihydro-2-thiazolyl)-1,3-dihydro-5(or 6)-nitro-2H-benzimidazole-2-thione is obtained by chromatography on alumina (neutral, activity I) and elution with cyclohexane-chloroform. The product is purified further by crystallization from

EXAMPLES 15-33

Following the procedures of Examples 12 to 14 but employing the substituted mercaptobenzimidazoles of formula VII shown in column A the products of formula III shown in column B are obtained.

Col. A

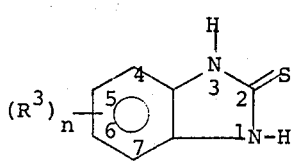

VII

Col. B

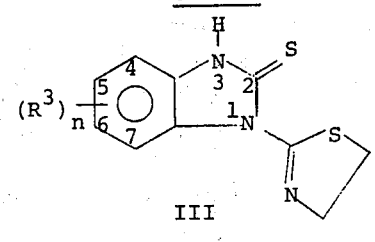

III

| Ex. | 4 | 5 | 4 or 7 | 5 or 6 |
|---|---|---|---|---|
| 15 | $NO_2$ | | $NO_2$ | |
| 16 | Br | | Br | |
| 17 | $CF_3$ | | $CF_3$ | |
| 18 | | CN | | CN |
| 19 | $C_2H_5$ | | $C_2H_5$ | |
| 20 | | $t-C_4H_9$ | | $t-C_4H_9$ |
| 21 | $OC_2H_5$ | | $OC_2H_5$ | |
| 22 | Cl | | Cl | |
| 23 | | $O-i-C_3H_7$ | | $O-i-C_3H_7$ |
| 24 | | $N<^{CH_3}_{CH_3}$ | | $N<^{CH_3}_{CH_3}$ |
| 25 | $N<^{C_2H_5}_{CH_3}$ | | $N<^{C_2H_5}_{CH_3}$ | |
| 26 | | $\overset{O}{\overset{\|}{C}}-\text{Ph}$ | | $\overset{O}{\overset{\|}{C}}-\text{Ph}$ |
| 27 | | $\overset{O}{\overset{\|}{C}}-C_2H_5$ | | $\overset{O}{\overset{\|}{C}}-C_2H_5$ |
| 28 | $\overset{O}{\overset{\|}{C}}-i-C_3H_7$ | | $\overset{O}{\overset{\|}{C}}-i-C_3H_7$ | |
| 29 | | $\overset{O}{\overset{\|}{C}}-C_4H_9$ | | $\overset{O}{\overset{\|}{C}}-C_4H_9$ |
| 30 | $\overset{O}{\overset{\|}{C}}-CH_3$ | | $\overset{O}{\overset{\|}{C}}-CH_3$ | |

Also, the following disubstituted compounds are obtained.

| | Col. A | | | | Col. B | | |
|---|---|---|---|---|---|---|---|
| Ex. | 4 | 5 | 6 | 7 | 4 | 5 | 6 | 7 |
| 31 | | Cl | Cl | | | Cl | Cl | |
| 32 | | $OCH_3$ | $OCH_3$ | | | $OCH_3$ | $OCH_3$ | |
| 33 | $CH_3$ | | | $CH_3$ | $CH_3$ | | | $CH_3$ |

Similarly, by following the procedures of Examples 12 to 14 but also substituting for the 2-chloroethylisothiocyanate the haloalkylisothiocyanates of examples 2 to 10, other compounds within the scope of this invention are obtained.

EXAMPLE 34

1-(4,5-Dihydro-2-thiazolyl)-1,3-dihydro-3-(phenylmethyl)-2H-benzimidazole-2-thione A solution of 2.35 g. (0.1 mole) of 1-(4,5-dihydro-2-thiazolyl)-1,3-dihydro-2H-benzimidazole-2-thione from example 1, 1.88 g. (0.11 mole) of benzyl bromide and 0.2 ml. (0.25 mole) of pyridine in 50 ml. of dry toluene is heated at reflux temperature for 16 hours. The reaction mixture is cooled, washed with N sodium hydroxide, water, and saturated brine, dried ($CaCl_2$) and concentrated in vacuo. The 1-(4,5-dihydro-2-thiazolyl)-1,3-dihydro-3-(phenylmethyl)-2H-benzimidazole-2-thione is obtained by crystallization from acetone-hexane.

EXAMPLE 35

1-(4,5-Dihydro-2-thiazolyl)-1,3-dihydro-3-(1-oxooctadecyl)-2H-benzimidazole-2-thione A solution of 3.32 g. (0.11 mole) of stearoyl chloride in 25 ml. of dry toluene is added to a stirred solution of 2.35 g. (0.1 mole) of 1-(4,5-dihydro-2-thiazolyl)-1,3-dihydro-2H-benzimidazole-2-thione from example 1 and 0.2 ml. (0.25 mole) of pyridine in 25 ml. of dry toluene at 0° to 5°. The reaction mixture is stirred at 0° to 5° for 1 hour and is then heated at reflux temperature for 3 hours. The reaction mixture is cooled, washed with N sodium hydroxide, water, and saturated brine, dried ($CaCl_2$) and concentrated in vacuo. The 1-(4,5-dihydro-2-thiazolyl)-1,3-dihydro-3-(1-oxooctadecyl)-2H-benzimidazole-2-thione is obtained by crystallization from aqueous ethanol.

EXAMPLES 36-68

Following the procedures of Examples 34 and 35 but substituting for the benzyl bromide and stearoyl chloride the compounds listed below in column A, there are obtained the compounds of the following formula wherein $R^2$ is the radical listed in column B:

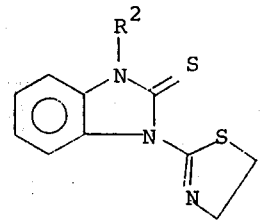

| Ex. | Col. A | Col. B |
|---|---|---|
| 36 | $C_2H_5Br$ | $-C_2H_5$ |
| 37 | $n-C_5H_{11}Cl$ | $-n-C_5H_{11}$ |
| 38 | $\text{o-}NO_2\text{-C}_6H_4\text{-}CH_2Cl$ | $-CH_2\text{-C}_6H_4\text{-}NO_2\text{(o)}$ |
| 39 | $\text{m-}NO_2\text{-C}_6H_4\text{-}CH_2Cl$ | $-CH_2\text{-C}_6H_4\text{-}NO_2\text{(m)}$ |

-continued

| Ex. | Col. A | Col. B |
|---|---|---|
| 40 |  O₂N—⌬—CH₂Cl | —CH₂—⌬—NO₂ |
| 41 | 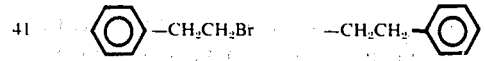 ⌬—CH₂CH₂Br | —CH₂CH₂—⌬ |
| 42 | 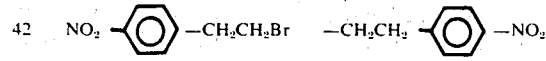 NO₂—⌬—CH₂CH₂Br | —CH₂CH₂—⌬—NO₂ |
| 43 | SCN(CH₂)₃Cl |  |
| 44 | SCNCH₂CHCH₂Br<br>         CH₃ | 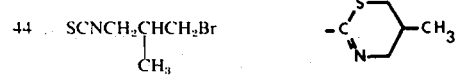 |
| 45 | 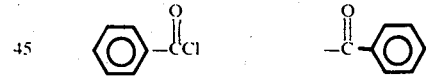 ⌬—CCl (O) | —C(O)—⌬ |
| 46 | 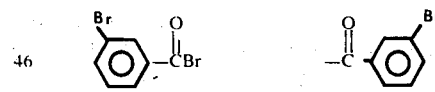 Br-⌬—CBr (O) | —C(O)—⌬-Br |
| 47 | 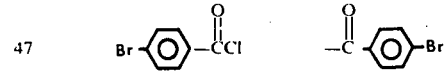 Br—⌬—CCl (O) | —C(O)—⌬—Br |
| 48 |  ⌬(Br)—C—Cl (O) | —C(O)—⌬(Br) |
| 49 |  ⌬(Cl)—COCl | —C(O)—⌬(Cl) |
| 50 |  ⌬(Cl)—COCl | —C(O)—⌬(Cl) |
| 51 | Cl-⌬—COCl | —C(O)—⌬—Cl |
| 52 | H₃C-⌬—COCl | —C(O)—⌬—CH₃ |
| 53 |  ⌬⌬—CCl (O) | —C(O)—⌬⌬ |
| 54 | CH₃O—CBr (O) | —C(O)—OCH₃ |
| 55 | C₂H₅O—CCl (O) | —C(O)—OC₂H₅ |
| 56 | C₃H₇O—CCl (O) | —C(O)—OC₃H₇ |
| 57 | 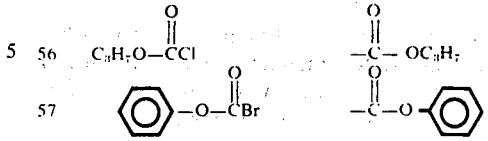 ⌬—O—CBr (O) | —C(O)—O—⌬ |
| 58 |  ⌬—CH₂—O—CCl (O) | —C(O)—O—CH₂—⌬ |
| 59 | 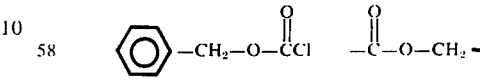 ⌬—(CH₂)₂—O—CCl (O) | —C(O)—O—(CH₂)₂—⌬ |
| 60 | (CH₃)(CH₃)N—(CH₂)₂Cl | —(CH₂)₂—N(CH₃)(CH₃) |
| 61 | (CH₃)(C₃H₇)N—(CH₂)₃Cl | —(CH₂)₃—N(CH₃)(C₃H₇) |
| 62 | CH₃O—C(O)—CH₂Br | —CH₂—C(O)—OCH₃ |
| 63 | CH₃O—C(O)—(CH₂)₂Cl | —(CH₂)₂—C(O)—OCH₃ |
| 64 | C₂H₅O—C(O)—(CH₂)₃Br | —(CH₂)₃—C(O)—OC₂H₅ |
| 65 | C₅H₁₁O—C(O)—(CH₂)₂Cl | —(CH₂)₂—C(O)—OC₅H₁₁ |
| 66 | C₂H₅COBr | —CC₂H₅ (O) |
| 67 | CH₃COBr | —CCH₃ (O) |
| 68 | CH₃(CH₂)₄COCl | —C(O)(CH₂)₄CH₃ |

Similarly by following the procedures of Examples 34 and 35 but substituting for the 1-(4,5-dihydro-2-thiazolyl)-1,3-dihydro-2H-benzimidazole-2-thione the product of Example 2 or Examples 3 to 10, other compounds within the scope of this invention are prepared.

EXAMPLE 69

3-(4,5-Dihydro-2-thiazolyl)-2,3-dihydro-N-phenyl-2-thioxo-1H-benzimidazole-1-carboxamide A solution of 1.17 g. (0.05 mole) of 1-(4,5-dihydro-2-thiazolyl)-1,3-dihydro-2H-benzimidazole-2-thione from Example 1 and approximately 2 ml. of phenyl isocyanate (0.10-0.15 mole) in 100 ml. of dry toluene is heated overnight at reflux temperature. The solution is cooled, diluted with one volume of hexane, and a precipitate consisting mainly of unreacted starting material is removed by filtration. The filtrate is washed with dilute aqueous Na₂CO₃ and water, dried (CaCl₂) and concentrated in vacuo. The residue is triturated with hexane and the solid that forms is collected and crystallized from acetone-hexane yielding 0.45 g. of 3-(4,5-dihydro-2-thiazolyl-2,3-dihydro-N-phenyl-2-thioxo-1H-benzimidazole-1-carboxamide; m.p. 138°–140°

EXAMPLES 70-76

Following the procedure of Example 69 but substituting for the phenyl isocyanate the the compounds listed below in column A, there is obtained respectively the compound of the following formula wherein R² is the radical listed in column B:

13

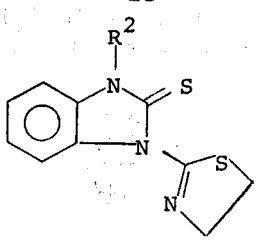

| Ex. | Col. A | Col. B |
|---|---|---|
| 70 | Ph—N=C=S | -C(=S)-N(H)-Ph |
| 71 | Ph—CH$_2$—N=C=O | -C(=O)-N(H)-CH$_2$-Ph |
| 72 | Ph—CH$_2$—N=C=S | -C(=S)-N(H)-CH$_2$-Ph |
| 73 | Ph—(CH$_2$)$_2$—N=C=O | -C(=O)-N(H)-(CH$_2$)$_2$-Ph |
| 74 | CH$_3$—N=C=O | -C(=O)-N(H)-CH$_3$ |
| 75 | C$_2$H$_5$—N=C=S | -C(=S)-N(H)-C$_2$H$_5$ |
| 76 | C$_3$H$_7$—N=C=O | -C(=O)-N(H)-C$_3$H$_7$ |

Similarly, by following the procedure of Example 69 but also substituting for the 1-(4,5-dihydro-2-thiazolyl)-1,3-dihydro-2H-benzimidazole-2-thione the products of Examples 2 to 10, other compounds within the scope of this invention are obtained.

EXAMPLE 77

5(or 6)-Amino-1-(4,5-dihydro-2-thiazolyl)-1,3-dihydro-2H-benzimidazole-2-thione, hydrochloride 2.8 g. (0.01 mole) of 1-(4,5-dihydro-2-thiazolyl)-1,3-dihydro-5(or 6)-nitro-2H-benzimidazole-2-thione from Example 14 in 200 ml. of ethanol is reduced with hydrogen over Raney Nickel catalyst at a pressure of 3 to 4 atmospheres. The catalyst is removed by filtration and the filtrate is reduced in vacuo to a volume of about 50 ml. and then saturated with dry HCl. Upon standing, the hydrochloride precipitates and is purified by crystallization from ethanol yielding the 5(or 6)-amino-1-(4,5-dihydro-2-thiazolyl)-1,3-dihydro-2H-benzimidazole-2-thione, hydrochloride.

What is claimed is:
1. A compound of the formula:

14

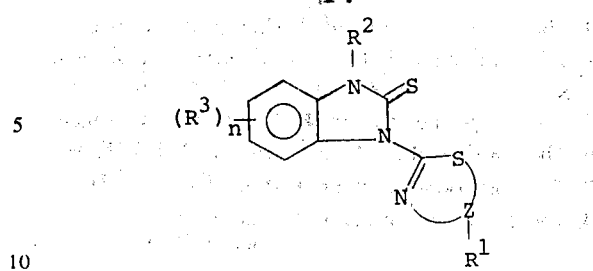

wherein Z is ethylene or propylene; $R^1$ is hydrogen, methyl, ethyl, phenyl, nitrophenyl, benzyl, phenethyl, tolyl, or xylyl; $R^2$ is hydrogen, alkyl of 1 to 5 carbons, benzyl, nitrobenzyl, phenethyl, nitrophenethyl, alkoxycarbonylalkylene wherein alkoxy is of 1 to 5 carbons and alkylene is of 1 to 3 carbons, dialkylaminoalkylene wherein each alkyl is of 1 to 3 carbons and alkylene is of 2 or 3 carbons, alkanoyl of from 2 to 18 carbons, benzoyl, substituted benzoyl wherein said substituent is halogen, alkyl of 1 to 3 carbons, or phenyl,

wherein $R^1$ and Z are as defined above,

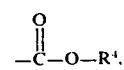

or

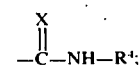

X is oxygen or sulfur; $R^4$ is alkyl of 1 to 3 carbons, phenyl, benzyl, or phenethyl; $R^3$ is hydrogen, halogen, nitro, amino, cyano, trifluoromethyl, alkyl of 1 to 3 carbons, alkoxy of 1 to 3 carbons, dialkylamino wherein each alkyl is of 1 to 3 carbons, alkanoyl of 2 to 6 carbons, or benzoyl; and n is one of two; and when $R^2$ is dialkylaminoalkylene or $R^3$ is amino or dialkylamino the pharmaceutically acceptable acid-addition salts.

2. The compounds of claim 1 wherein $R^1$ is hydrogen; $R^2$ is hydrogen, alkyl of 1 to 3 carbons

wherein Z is ethylene or propylene, benzyl, -(CH$_2$)$_2$-N(CH$_3$)$_2$,

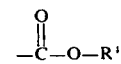

or

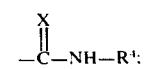

$R^4$ is alkyl of 1 to 3 carbons or phenyl; $R^3$ is hydrogen, halogen, nitro, or alkyl of 1 to 3 carbons; and n is one.

3. The compound of claim 2 wherein Z is ethylene.
4. The compound of claim 3 wherein R² is hydrogen; and R³ is hydrogen, CH₃ or Cl.
5. The compound of claim 4 wherein R³ is hydrogen.
6. The compound of claim 4 wherein R³ is CH₃.
7. The compound of claim 4 wherein R³ is Cl.
8. The compound of claim 3 wherein R² is

9. The compound of claim 3 wherein R² is

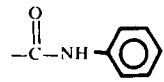

10. The compound of claim 2 wherein Z is propylene.
11. The compound of claim 10 wherein R² is hydrogen.

UNITED STATES PATENT AND TRADEMARK OFFICE
CERTIFICATE OF CORRECTION

PATENT NO. : 3,926,982
DATED : December 16, 1975
INVENTOR(S) : G. Rovnyak et al.

It is certified that error appears in the above-identified patent and that said Letters Patent are hereby corrected as shown below:

Under inventors, "Rudiger D. Haughwitz" should read --Rudiger D. Haugwitz--.

Col. 3, line 19, "formula II" should read --formula III--.

Col. 5, line 5, "exixirs" should read --elixirs--.

Signed and Sealed this fourth Day of May 1976

[SEAL]

Attest:

RUTH C. MASON
*Attesting Officer*

C. MARSHALL DANN
*Commissioner of Patents and Trademarks*